United States Patent
Kim et al.

(10) Patent No.: US 12,325,617 B2
(45) Date of Patent: Jun. 10, 2025

(54) WATER PURIFIER AND METHOD FOR CONTROLLING SAME

(71) Applicant: SAMSUNG ELECTRONICS CO., LTD., Suwon-si (KR)

(72) Inventors: Seokuk Kim, Suwon-si (KR); Kyungkeun Park, Suwon-si (KR); Kookjeong Seo, Suwon-si (KR); Seonjeong Lee, Suwon-si (KR); Jongho Lee, Suwon-si (KR); Doyun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 18/120,684

(22) Filed: Mar. 13, 2023

(65) Prior Publication Data

US 2023/0219801 A1    Jul. 13, 2023

Related U.S. Application Data

(63) Continuation of application No. PCT/KR2021/010915, filed on Aug. 18, 2021.

(30) Foreign Application Priority Data

Oct. 14, 2020   (KR) .................. 10-2020-0132335

(51) Int. Cl.
*B67D 1/08*    (2006.01)
*B67D 1/00*    (2006.01)
*C02F 1/00*    (2023.01)

(52) U.S. Cl.
CPC ......... *B67D 1/0859* (2013.01); *B67D 1/0014* (2013.01); *B67D 1/0884* (2013.01);
(Continued)

(58) Field of Classification Search
CPC .. B67D 1/0859; B67D 1/0014; B67D 1/0864; B67D 1/0884; B67D 1/0858;
(Continued)

(56) References Cited

U.S. PATENT DOCUMENTS 9,523,514 B2   12/2016   Lilley et al.
9,856,126 B2   1/2018    Jeon
(Continued)

FOREIGN PATENT DOCUMENTS

EP    3 561 419 A1    10/2019
JP    2001002193 A  *  1/2001
(Continued)

OTHER PUBLICATIONS

Office Action dated Dec. 20, 2023, in European Application No. 21880293.2.
(Continued)

*Primary Examiner* — Emmanuel E Duke
(74) *Attorney, Agent, or Firm* — STAAS & HALSEY LLP

(57) ABSTRACT

A water purifier includes a water tank having a cold water path inside the tank, a coolant inside the water tank, a cooling device including an evaporator inside the water tank and through which a refrigerant flows, and a compressor that is operable to compress the refrigerant. The cooling device is configured to cool the coolant to cool water flowing through a temperature sensor, which is configured to detect a temperature of the coolant and output coolant temperature information about the detected temperature of the coolant. The purifier also includes an agitator operable to agitate the coolant and a controller configured to control the compressor and the agitator to operate simultaneously and control the agitator to stop operating while the compressor is controlled to continue operating based on preset ice-making
(Continued)

temperature information and the coolant temperature information. There is also a method of controlling a compressor and an agitator.

15 Claims, 13 Drawing Sheets

(52) U.S. Cl.
CPC ...... *C02F 1/003* (2013.01); *B67D 2210/0001* (2013.01); *C02F 2307/10* (2013.01)
(58) Field of Classification Search
CPC ............... B67D 1/0895; B67D 1/1202; B67D 2210/0001; B67D 2210/00163; C02F 1/003; C02F 1/02; C02F 1/22; C02F 1/008; C02F 2307/10; C02F 2209/02; F25D 31/003; F25D 31/002; F25D 29/00; F25D 2700/12; Y02E 60/14; F28D 20/02
See application file for complete search history.

(56) References Cited

U.S. PATENT DOCUMENTS

| | | | |
|---|---|---|---|
| 10,408,533 B2 | 9/2019 | Kim et al. | |
| 10,473,380 B2 | 11/2019 | Park et al. | |
| 11,312,606 B2 | 4/2022 | Nam et al. | |
| 2008/0276629 A1* | 11/2008 | Yamamoto | F25C 1/145 62/458 |
| 2018/0016129 A1* | 1/2018 | Park | C02F 1/18 |

FOREIGN PATENT DOCUMENTS

| | | | | |
|---|---|---|---|---|
| JP | 2006-81987 | | 3/2006 | |
| JP | 3908823 | | 4/2007 | |
| JP | 4147026 | | 9/2008 | |
| JP | 2015-535730 | | 12/2015 | |
| JP | 6582102 | | 9/2019 | |
| KR | 10-2010-0078802 | | 7/2010 | |
| KR | 20100078802 A | * | 7/2010 | ........... F25D 31/003 |
| KR | 10-2011-0065188 | | 6/2011 | |
| KR | 10-2012-0140417 | | 12/2012 | |
| KR | 20120140417 A | * | 12/2012 | ........... B67D 1/0888 |
| KR | 10-1259621 | | 4/2013 | |
| KR | 10-1631214 | | 6/2016 | |
| KR | 10-1685985 | | 12/2016 | |
| KR | 10-2018-0024974 | | 3/2018 | |
| KR | 10-2019-0107873 | | 9/2019 | |
| KR | 10-2019-0116835 | | 10/2019 | |
| KR | 10-2019-0127133 | | 11/2019 | |
| KR | 10-2042570 | | 11/2019 | |
| KR | 20190139192 A | * | 12/2019 | |
| KR | 10-2150387 | | 10/2020 | |
| KR | 10-2376013 | | 3/2022 | |
| KR | 10-2445207 | | 9/2022 | |
| WO | WO 2019/194453 A1 | | 10/2019 | |

OTHER PUBLICATIONS

International Search Report, PCT/ISA/210, issued in International Application No. PCT/KR2021/010915 dated Dec. 7, 2021.
Written Opinion, PCT/ISA/220, issued in International Application No. PCT/KR2021/010915 dated Dec. 7, 2021.

* cited by examiner

WATER PURIFIER AND METHOD FOR CONTROLLING SAME

CROSS REFERENCE TO RELATED APPLICATION(S)

This application is a continuation of PCT Application No. PCT/KR2021/010915, filed on Aug. 18, 2021, and claims priority to Korean Patent Application No. 10-2020-0132335, filed on Oct. 14, 2020, the disclosures of which are incorporated by reference herein in their entireties.

BACKGROUND

1. Field

The present disclosure relates to a water purifier for supplying purified water, and a method for controlling the same.

2. Description of Related Art

In general, a water purifier is an apparatus for filtering impurities included in raw water or tap water by a physical or chemical method and then providing the filtered water (that is, purified water) to users.

There is a water purifier that provides users with purified water having a room temperature, purified water (that is, cold water) having a lower temperature than the room temperature, and purified water (that is, hot water) having a higher temperature than the room temperature.

A water purifier that supplies cold water includes a cooler for lowering the temperature of water below a room temperature. The cooler may use an ice water accumulation type method as one of cooling methods.

The cooler that uses the ice water accumulation method has a problem that an amount of ice made inside a cooling tank fails to exceed a minimum amount or exceeds a maximum amount by an agitating operation of an agitator, and in the case in which a supply amount of cold water by a user's request exceeds a reference amount, the cooler fails to make cold water within a reference time and thus supplies purified water having a room temperature.

SUMMARY

A water purifier according to an aspect includes: a water tank having a cold water path inside the tank; a coolant inside the water tank; a cooling device including an evaporator inside the water tank and through which a refrigerant flows, and a compressor that is operable to compress the refrigerant, the cooling device configured to cool the coolant so that the coolant cools water flowing through the a temperature sensor configured to detect a temperature of the coolant and output coolant temperature information about the detected temperature of the coolant; an agitator that is operable to agitate the coolant; and a controller configured to control the compressor and the agitator to operate simultaneously and control the agitator to stop operating while the compressor is controlled to continue operating based on preset ice-making temperature information and the coolant temperature information.

The controller of the water purifier according to an aspect may identify whether the temperature of the coolant is higher than or equal to a preset on temperature of the compressor based on the coolant temperature information, and, based on identifying that the temperature of the coolant is higher than or equal to the preset on temperature of the compressor, the controller may control the compressor and the agitator to operate simultaneously.

The preset ice-making temperature of the water purifier according to an aspect may be lower than or equal to the preset on temperature of the compressor.

The controller of the water purifier according to an aspect may identify whether the temperature of the coolant reaches the preset ice-making temperature based on the preset ice-making temperature and the coolant temperature information, and based on identifying that the temperature of the coolant reaches the preset ice-making temperature, the controller may perform the control of the agitator to stop operating while the compressor is controlled to continue operating.

The controller of the water purifier according to an aspect may control the agitator to stop operating stops the agitator from operating for a preset ice-making time.

After the agitator has stopped operating for the preset ice-making time, the controller of the water purifier according to an aspect may control the compressor and the agitator to operate simultaneously by controlling the agitator to again operate.

The controller of the water purifier according to an aspect may identify whether the temperature of the coolant is lower than or equal to a preset off temperature of the compressor based on the coolant temperature information, and based on identifying that the temperature of the coolant is lower than or equal to the preset off temperature of the compressor, the controller may control the compressor and the agitator to stop operating simultaneously.

The water purifier according to an aspect may further include: an inputter configured to receive a cold water supply command from a user; and a cold water supply valve connected with the cold water path, wherein the controller may control, upon reception of the cold water supply command through the inputter, opening of the cold water supply valve and control the agitator to operate.

The controller of the water purifier according to an aspect may control operation of the compressor alone or operation of the compressor and the agitator simultaneously.

The agitator of the water purifier according to an aspect may include an agitating motor, and an agitating body configured to agitate the coolant by rotation of the agitating body.

The water purifier according to an aspect may further include a filter module configured to purify water by removing impurities from input raw water and to transfer the purified water to the water tank.

The water purifier according to an aspect may further include a hot water module configured to provide hot water by heating the purified water.

A water purifier according to another aspect includes: a water tank accommodating a coolant; a temperature sensor configured to detect a temperature of the coolant and output coolant temperature information about the detected temperature of the coolant; a cold water path provided inside the water tank and cooled by a cooling device, wherein water flows through the cold water path; the cooling device configured to cool the coolant; an agitator provided inside the water tank and configured to agitate the coolant; and a controller configured to control the agitator to operate or stop based on the coolant temperature information and preset ice-making temperature information while the cooling device operates.

The controller of the water purifier according to another aspect may control the agitator to operate while the temperature of the coolant is lower than or equal to the preset ice-making temperature, based on the coolant temperature information and the preset ice-making temperature information, and control the agitator to stop while the temperature of the coolant exceeds the preset ice-making temperature.

The controller of the water purifier according to another aspect may control the agitator to again operate based on preset ice-making time information.

The water purifier according to another aspect may further include an inputter configured to receive a user input; a cold water supply valve connected with the cold water path; and a water supply module configured to supply water to a user, wherein the controller may control opening of the cold water supply valve upon reception of a cold water supply command through the inputter, and control the agitator to operate.

The controller of the water purifier according to another aspect may identify whether the temperature of the coolant is lower than or equal to a preset off temperature of a compressor based on the coolant temperature information while the agitator again operates, and according to an identification that the temperature of the coolant is lower than or equal to the preset off temperature of the compressor, the controller may control the agitator and the compressor provided in the cooling device to stop simultaneously.

A method for controlling a water purifier that includes a water tank having a cold water path inside the water tank, a coolant inside the water tank, a cooling device including an evaporator inside the water tank through which a refrigerant flows and a compressor that is operable to compress the refrigerant so that the cooling device is configured to cool the coolant so that the coolant cools water flowing through the cold water path, a temperature sensor configured to detect a temperature of the coolant and output coolant temperature information about the detected temperature of the coolant, and an agitator that is operable to agitate the coolant, the method, according to another aspect, the method includes: based on the coolant temperature information output by the temperature sensor indicating that the temperature of the coolant is lower than or equal to a preset ice-making temperature; performing a first mode of simultaneously operating the compressor and the agitator; after the first mode, performing a second mode of stopping the operation of the agitator and continuing operation of the compressor for a preset ice-making time so that ice is made around the evaporator after the coolant is cooled to a temperature being lower than or equal to the preset ice-making temperature; and after a preset ice-making time from when the operation of the agitator was stopped, performing a third mode of simultaneously operating the agitator and the compressor by again operating the agitator such that ice around the evaporator is maintained in a frozen state.

The method of controlling the water purifier which includes an inputter configured to receive a cold water supply command from a user, and a cold water supply valve connected with the cold water path, according to another aspect, may further include: controlling opening of the cold water supply valve upon reception of the cold water supply command through the inputter; and after opening the cold water supply valve, controlling the agitator to operate.

The method of controlling the water purifier which includes an inputter configured to receive a cold water supply command from a user, and a cold water supply valve connected with the cold water path, according to another aspect, may further include: controlling opening of the cold water supply valve upon reception of the cold water supply command through the inputter in a state in which the agitator is controlled to stop operating, to supply cold water to the cold water path; and controlling, upon completion of the supply of cold water to the cold water path, the agitator to again operate based on a temperature of the coolant and the preset ice-making temperature.

BRIEF DESCRIPTION OF THE DRAWINGS

Aspects, features, and advantages of certain embodiments of the present disclosure will be more apparent from the following description taken in conjunction with the accompanying drawings, in which.

DETAILED DESCRIPTION

Figure 1:
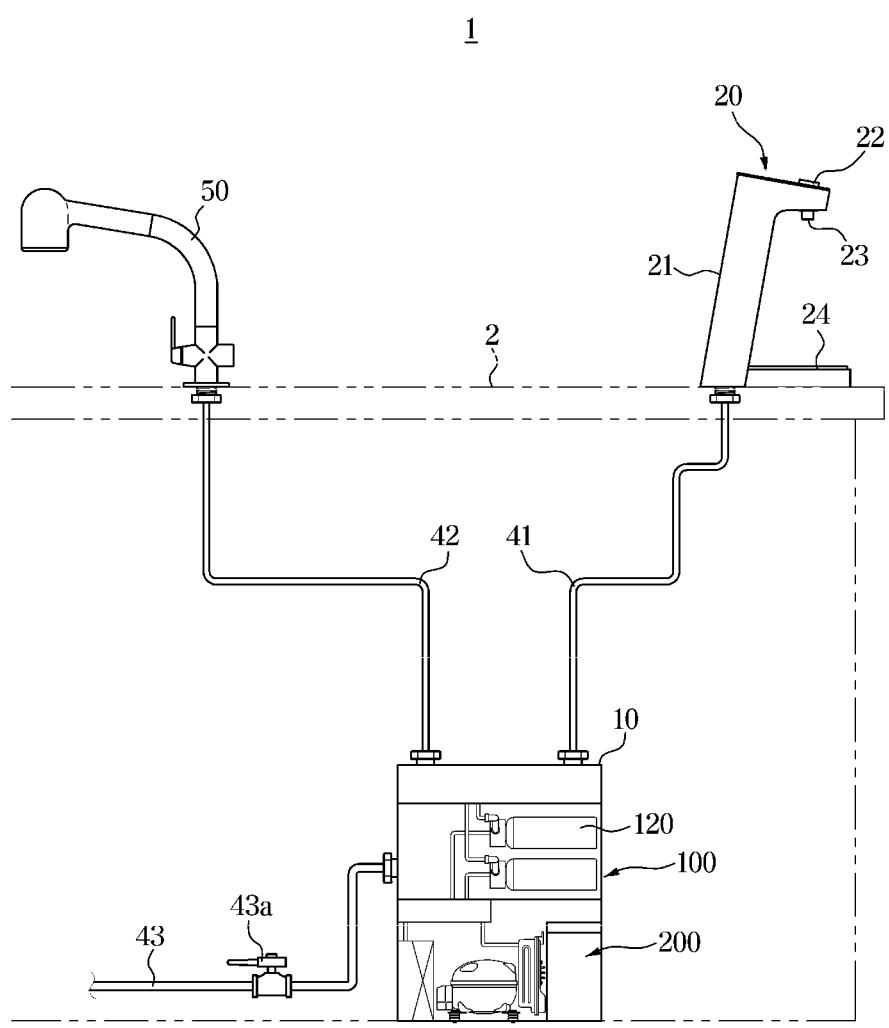
FIG. 1 shows an example of a water purifier according to an aspect.

Like reference numerals will refer to like components throughout this specification. This specification does not describe all components of the embodiments, and general information in the technical field to which the present disclosure belongs or overlapping information between the embodiments will not be described.

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are merely used to describe embodiments, and are not intended to limit and/or restrict the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

Also, it will be understood that, although the terms including ordinal numbers, such as "first", "second", etc., may be used herein to describe various components, these components should not be limited by these terms. These terms are only used to distinguish one component from another. For example, a first component discussed below could be termed a second component, and similarly, a second component may be termed a first component without departing from the teachings of this disclosure. As used herein, the term "and/or" includes any and all combinations of one or more of associated listed items.

In the following description, the terms "front surface", "rear surface", etc. are defined based on the drawings, and the shapes and positions of the corresponding components are not limited by the terms.

Hereinafter, an embodiment of the disclosure will be described in detail with reference to the accompanying drawings.

An aspect of the disclosure provides a water purifier for continuously supplying cold water by adjusting a simultaneous operation time of a compressor and an agitator and an individual operation time of the compressor, and a method for controlling the water purifier.

Another aspect of the disclosure provides a water purifier for preventing a sudden freeze of a water tank by adjusting a simultaneous operation time of a compressor and an agitator and an individual operation time of the compressor, and a method for controlling the water purifier.

According to an aspect, a water purifier may easily make ice on a surface of an evaporator inside a water tank.

By agitating a coolant with an agitator after ice is made on the surface of the evaporator, an amount of ice accumulation on the surface of the evaporator may increase.

By uniformly adjusting a temperature (that is, a preset ice-making temperature) at which a compressor operates alone and a time (that is, a preset ice-making time) for which the compressor operates alone by stopping the agitator, a case in which a maximum amount of ice or more is made on the surface of the evaporator and a case in which an operation of the agitator is limited by an excess amount of ice may be prevented.

By repeatedly performing a pre-cooling mode and an ice-making mode of making ice upon water supply (that is, water intake or water discharge) in correspondence to a user's request, a large amount of cold water may be made within a short time (that is, within a reference time). That is, the user may receive cold water that is more than a reference amount.

That is, the water purifier may continuously supply cold water falling within a preset reference temperature range (that is, below a first reference temperature) to a user, resulting in an improvement of the user's satisfaction and the marketability of a product.

FIG. 1 shows an example of a water purifier according to an aspect.

As shown in FIG. 1, a water purifier 1 may include a main body 10, and a water supply module 20 connected with the main body 10 and configured to supply purified water inside the main body 10 to a user.

The main body 10 of the water purifier 1 may be provided in another space than one where the water supply module is provided. For example, the main body 10 of the water purifier may be provided below a kitchen workbench 2, and the water supply module 20 may be provided on the kitchen workbench 2.

The main body 10 of the water purifier may be provided inside the kitchen workbench 2, and the water supply module 20 may be provided outside the kitchen workbench 2.

The water supply module 20 may include a housing 21 forming an appearance, an inputter 22 for user inputs, and a water discharging nozzle 23 for receiving purified water from the main body 10 and providing the purified water to a user in correspondence to a user input received through the inputter 22, and further include a remaining water tray 24 that is provided separately from the housing 21 and collects a part of purified water supplied through the water discharging nozzle 23 and not filled in the user's container.

The remaining water tray 24 may be provided at a location corresponding to the water discharging nozzle 23 of the water supply module 20. The remaining water tray 24 may be positioned below the water discharging nozzle 23.

The main body 10 of the water purifier 1 may be connected with the water supply module 20 through a first connection pipe 41.

The first connection pipe 41 may transfer purified water inside the main body 10 to the water supply module 20.

The main body 10 of the water purifier 1 may be connected with a second connection pipe 42 and a third connection pipe 43.

The second connection pipe 42 may be connected with a faucet 50 installed in a kitchen sink (not shown).

The third connection pipe 43 may receive raw water such as tap water and transfer the received raw water to the main body 10. In the third connection pipe 43, a raw water supply valve 43a may be provided to block raw water from being supplied to the main body 10.

The main body 10 may include a filter module 100 including one or at least two filters 120 for generating purified water by using raw water, and a cooling and heating module 200 for cooling or heating water purified by the filter module 100.

The cooling and heating module 200 may be detachably coupled with the filter module 100.

Also, in a case in which the water purifier has only a cold water function, the water purifier may include only a cold water module 200a, instead of the cooling and heating module 200. The cold water module 200a may be detachably coupled with the filter module 100.

Figure 2:
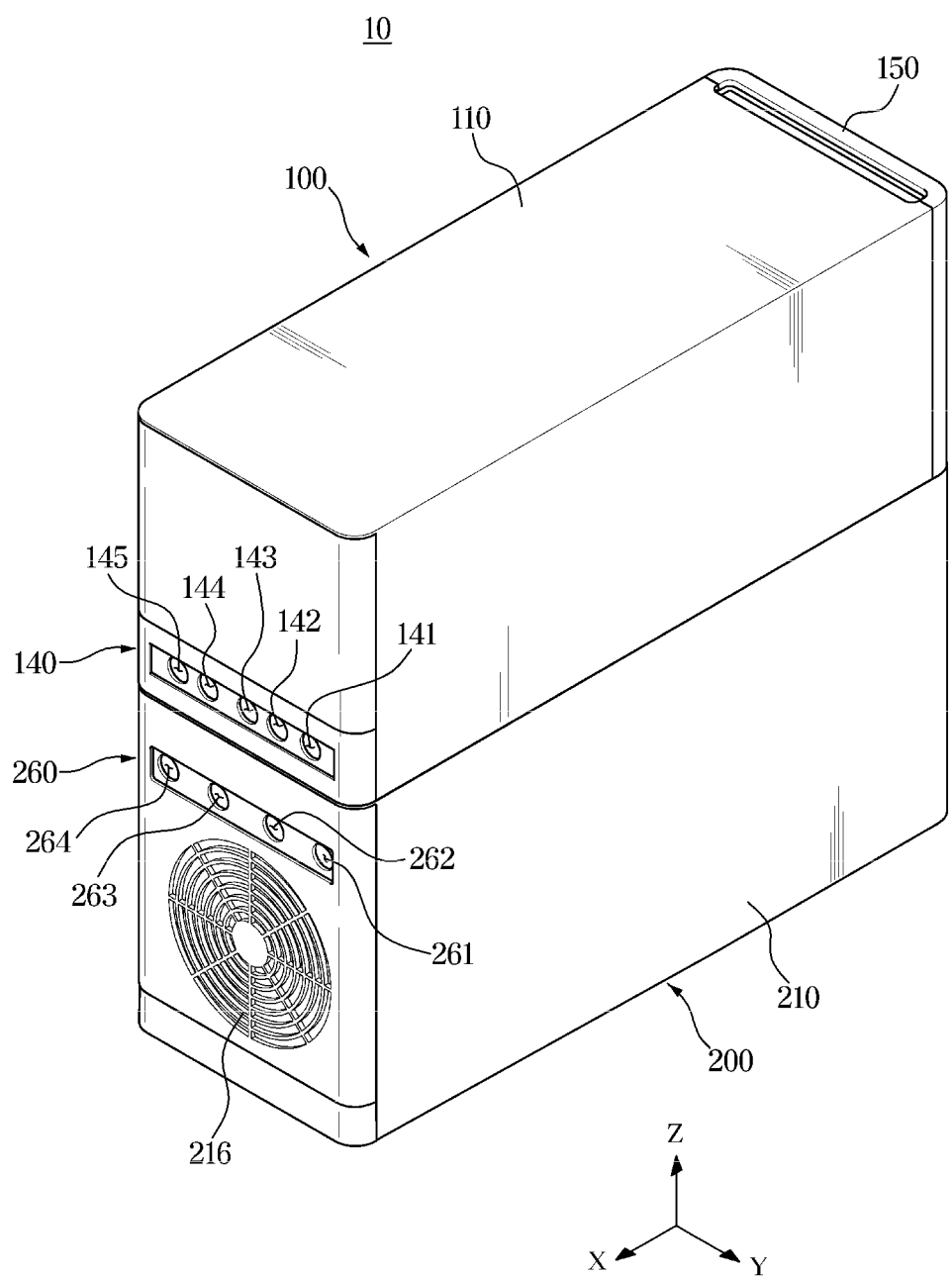
FIG. 2 shows an example of a main body of the water purifier shown in FIG. 1.
Figure 3:
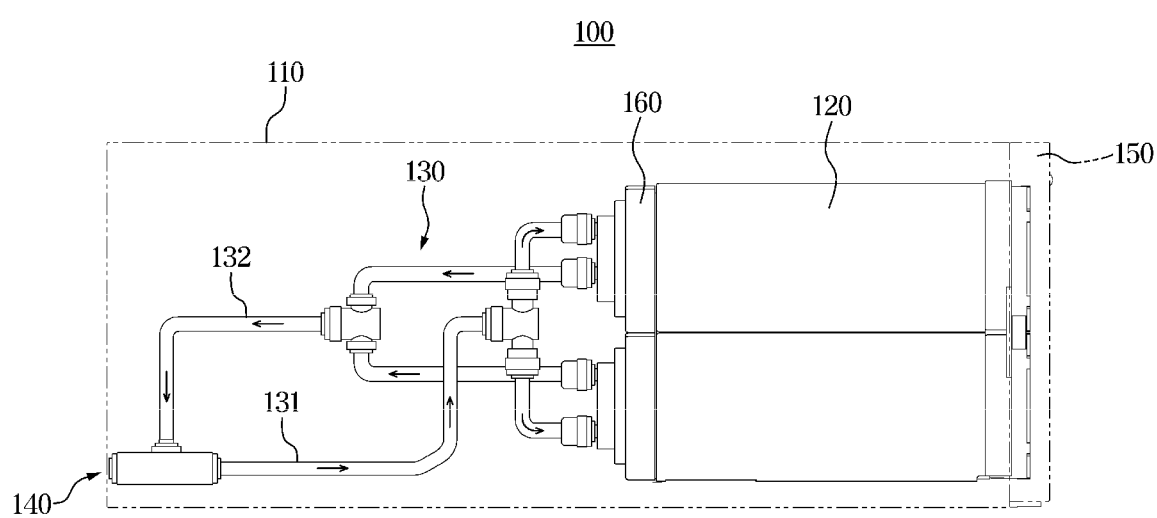
FIG. 3 shows an example of inside of a filter module of the water purifier shown in FIG. 1.
Figure 4:
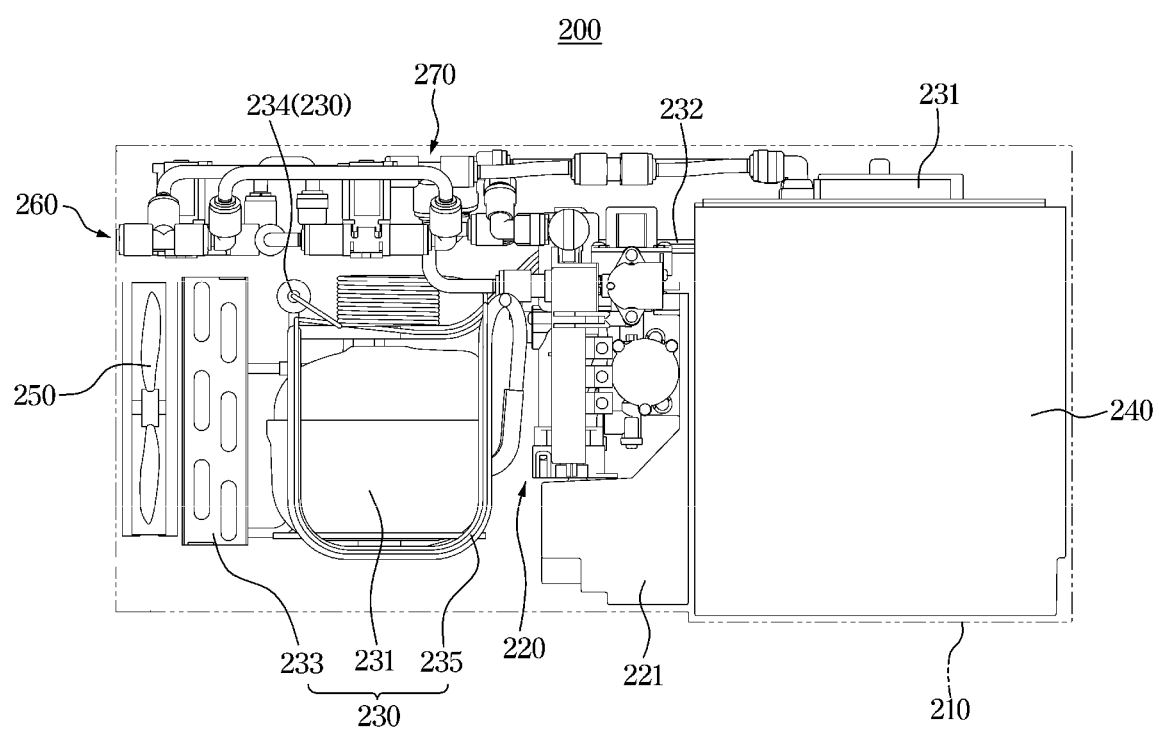
FIG. 4 shows an example of inside of a cooling and heating module of the water purifier shown in FIG. 1.

FIG. 2 shows an example of a main body of the water purifier shown in FIG. 1, FIG. 3 shows an example of inside of a filter module of the water purifier shown in FIG. 1, and FIG. 4 shows an example of inside of a cooling and heating module of the water purifier shown in FIG. 1.

As shown in FIG. 2, the main body 10 of the water purifier 1 may include the cooling and heating module 200 and the filter module 100.

The filter module 100 may include a first case 110 forming an appearance, a bracket 150 rotatably coupled with the first case 110, and a first inflow and outflow portion 140.

The bracket 150 may be rotatably coupled with a rear side of the first case 110. The rear side of the first case 110 may be opened or closed by the bracket 150.

The first inflow and outflow portion 140 of the filter module 100 may be formed on a front side of the first case 110. The first inflow and outflow portion 140 may include one or more inlets or outlets.

As shown in FIG. 3, the filter module 100 may include the one or at least two filters 120, the first inflow and outflow portion 140, and a first flow path 130 connected with the filters 120.

The filters 120 may include a pre-filter, a membrane filter as a water purifying filter, and a post-filter. The filters 120 may remove smell and foreign materials from raw water flowing in through the third connection pipe 43. Also, the filters 120 may add a flavor and taste to filtered, purified water.

Each of the filters 120 may include a head portion 160 provided at one end of the filter 120 and connected with the first flow path 130.

Water entering the filter 120 or being discharged from the filter 120 through the first inflow and outflow portion 140 may flow along the first flow path 130. The first flow path 130 may include a first inlet path 131 and a first outlet path 132.

The first inlet path 131 may cause water entered the first inflow and outflow portion 140 to flow to the filters 120 or to another inlet or outlet of the first inflow and outflow portion 140.

The first outlet path 132 may cause water discharged from the filter 120 to flow to the first inflow and outflow portion 140 or to another filter 120.

The first inflow and outflow portion 140 may include a raw water inlet 141, a cooking water outlet 142, a first purified water outlet 143, a drain inlet 144, and a drain outlet 145.

The individual components of the first inflow and outflow portion 140 may be connected with the first flow path 130 in the first case 110 to receive water or supply water to the first flow path 130.

The raw water inlet 141 may receive raw water through the third connection pipe 43. Raw water received by the raw water inlet 141 may enter the first case 110, and impurities in the raw water may be filtered by the first flow path 130 and the filters 120.

The cooking water outlet 142 may be formed adjacent to the raw water inlet 141, and discharge water to the faucet 50 through the second connection pipe 43.

The first purified water outlet 143 may transfer purified water filtered by the filters 120 to a water tank 240 inside the second case 210.

The first purified water outlet 143 may be connected with the water supply module 20 to transfer purified water to the water supply module 20. In this case, a purified water supply valve (not shown) may be provided between the first purified water outlet 143 and the water supply module 20, and the purified water supply valve may block purified water from being transferred from the first purified water outlet 143 to the water supply module 20. The purified water supply valve may be a solenoid valve.

The first purified water outlet 143 may be connected with a purified water inlet 261 of a second inflow and outflow portion 260.

In a case in which the water purifier includes a hot water module, the first purified water outlet 143 may transfer purified water filtered by the filters 120 to the hot water module.

Water drained from the water supply module 20 may enter the drain inlet 144.

Also, the drain inlet 144 may be connected with a drain outlet 264. In this case, water entered the drain inlet 144 may be discharged together with water to be drained from the cooling and heating module 200.

The drain outlet 145 may be connected with a drain pipe (not shown) and discharge water to outside.

As shown in FIG. 2, the cooling and heating module 200 may include a second case 210 forming an appearance, an exhaust grille 216 provided in a front side of the second case 210, and the second inflow and outflow portion 260.

The exhaust grille 216 may discharge inside heat of the main body to the outside.

The second inflow and outflow portion 260 of the cooling and heating module 200 may be formed in a front side of the second case 210. The second inflow and outflow portion 260 may include one or more inlets or outlets.

As shown in FIG. 4, the cooling and heating module 200 may include a heating device 220, a cooling device 230, and the water tank 240.

The cooling device 230 and the heating device 220 may be positioned inside the second case 210. Accordingly, because the cooling and heating module 200 is separated from the filter module 100, the cooling and heating module 200 may be attached to or detached from the water purifier 1 as necessary.

The heating device 220 may be provided on one side of the water tank 240. The heating device 220 may heat water discharged from the water tank 240 to generate hot water, and supply the generated hot water to a user.

The heating device 220 may heat purified water discharged from the filter module to generate hot water, and supply the generated hot water to the user.

The heating device 220 may include one or at least two heaters. The heaters may include ceramic heaters.

The cooling and heating module 200 may further include a supporting member 221 provided in one side of the heating device 220. The supporting member 221 may be positioned inside the second case 210. The supporting member 221 may prevent the heating device 220 from being greatly damaged although the heating device 220 is separated from the second case 210.

The cooling device 230 may include a compressor 231, an evaporator 232 connected with the compressor 231, a condenser 233 connected with the compressor 231, and an expander 234 connected with the condenser 233. The cooling device 230 may further include a refrigerant pipe 235 that connects the individual components with each other and enables a refrigerant to flow between the individual components. A configuration of the cooling device 230 will be described below.

The water tank 240 may store water purified through the filter module 100. The evaporator 232 may be provided inside the water tank 240 to take away heat from water stored in the water tank 240. The water tank 240 may be a cooling tank.

The cooling and heating module 200 may further include a fan 250 for emitting heat in the second case 210. The fan 250 may be provided adjacent to the condenser 233. Because the fan 250 emits heat in the second case 210 to the outside, the fan 250 may prevent components in the cooling and heating module 200 from overheating.

The cooling and heating module 200 may further include a second flow path 270. The second flow path 270 may discharge cold water cooled through the evaporator 233 and hot water heated through the heating device 220 to the second inflow and outflow portion 260. Also, the second flow path 270 may extend such that purified water discharged from the filter module 100 enters the cooling and heating module 200 through the second inflow and outflow portion 260 and is stored in the water tank 240.

The second inflow and outflow portion 260 may include the purified water inlet 261, a second purified water outlet 262, a hot water outlet 263, and the drain outlet 264.

The individual components of the second inflow and outflow portion 260 may be connected with the second flow path 270 in the second case 210 to receive water or supply water to the second flow path 270.

Water (that is, purified water) purified by the filter module 100 may enter the purified water inlet 261 through the first purified water outlet 143.

The second purified water outlet 262 may supply cold water or purified water to the water supply module 20.

The second purified water outlet 262 may supply hot water to the water supply module 20.

The hot water outlet 263 may supply hot water to the faucet 50.

The drain outlet 264 may discharge drain water of the cooling and heating module 200 through the drain inlet 144 of the first inflow and outflow portion 140.

Positions of the individual components of the first and second inflow and outflow portions are not limited to these, and the inlets and outlets may be positioned in various ways. Some of the individual components of the first and second inflow and outflow portions may be omitted.

In a case in which the water purifier supplies only cold water, the water purifier may include the cold water module 200a.

Figure 5:
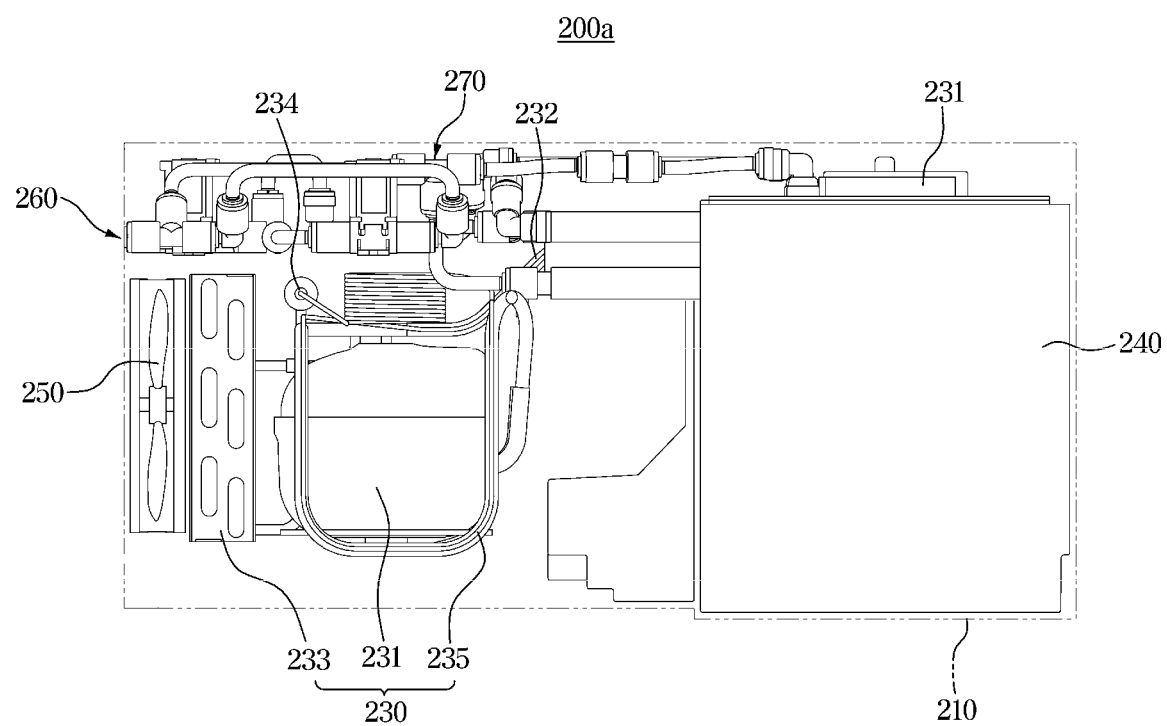
FIG. 5 shows an example of a cold water module provided in a water purifier.

FIG. 5 shows an example of the cold water module 200a provided in the water purifier, and the cold water module 200a of the water purifier may include all components of the cooling and heating module 200 shown in FIG. 4 except for the heating device 220 and the flow path connected with the heating device 220. That is, the heating device 220 and the flow path connected with the heating device 220 may be omitted from the cold water module 200a of the water purifier.

A hot water outlet may be omitted from a case 210a of the cold water module 200a.

Figure 6:
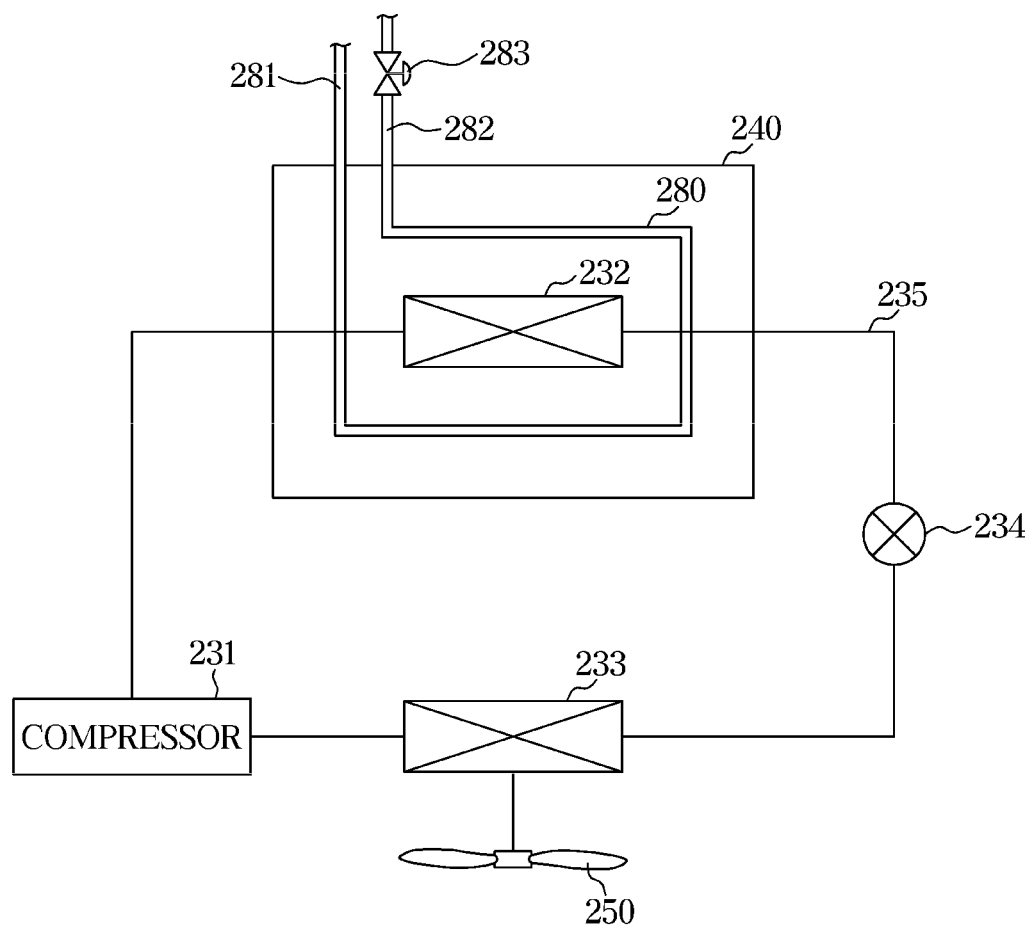
FIG. 6 shows an example of a connection between a water tank and a cooling device of a cooling and heating module provided in a water purifier according to an embodiment.
Figure 7:
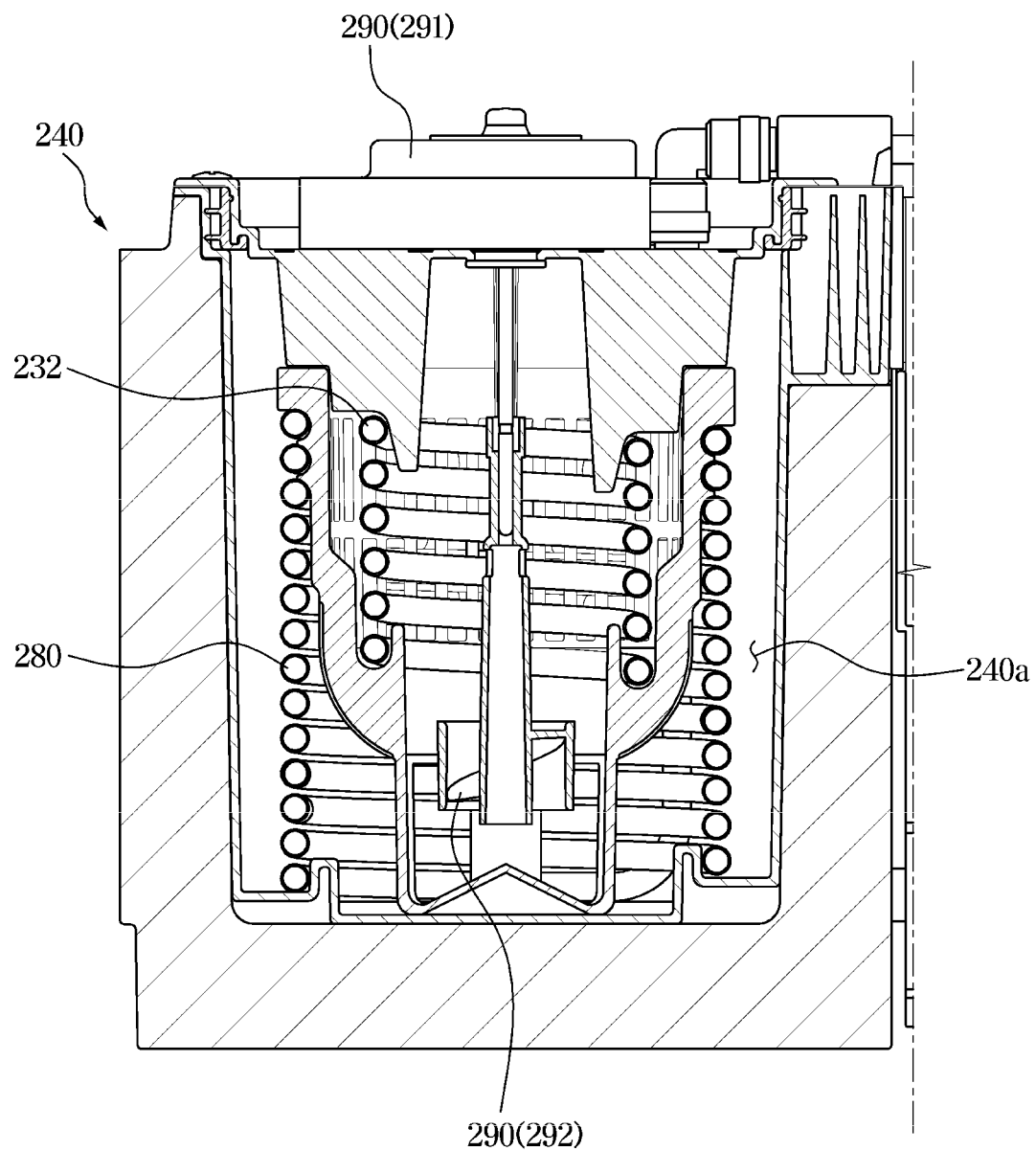
FIG. 7 shows an example of inside of a water tank of a cooling and heating module provided in a water purifier according to an embodiment.
Figure 8:
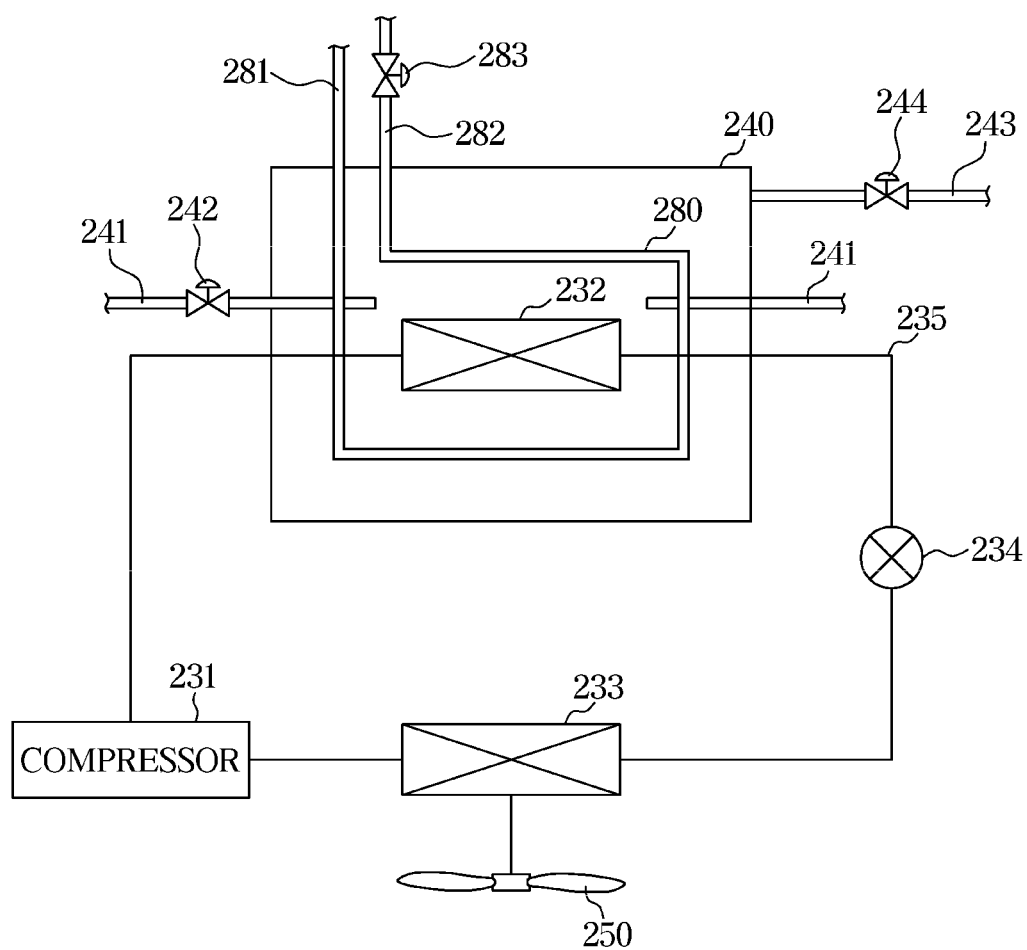
FIG. 8 shows a modified example of a connection between a water tank and a cooling device of a cooling and heating module provided in a water purifier according to an embodiment.

FIG. 6 shows an example of a connection between a water tank and a cooling device of a cooling and heating module provided in a water purifier according to an embodiment, FIG. 7 shows an example of inside of a water tank of a cooling and heating module provided in a water purifier according to an embodiment, and FIG. 8 shows a modified example of a water tank and a cooling device of a cooling and heating module provided in a water purifier according to an embodiment.

As shown in FIG. 6, the cooling device 230 of the cooling and heating module may include the compressor 231, the evaporator 232, the condenser 233, and the expander 234, and further include the refrigerant pipe 235 connecting the components with each other and enabling a refrigerant to flow between the components.

The compressor 231 may compress the refrigerant and discharge the compressed refrigerant being in a high-temperature, high-pressure gaseous state to the condenser 233.

The condenser 233 may be connected with a discharging portion of the compressor 231 through the refrigerant pipe 235, and condense the refrigerant received from the compressor 231 through heat dissipation of the refrigerant. At this time, the refrigerant being in the high-temperature, high-pressure gaseous refrigerant may change in phase to a refrigerant being in a high-temperature, high-pressure liquid state.

The fan 250 may be provided to one side of the condenser 233 inside the second case 210, and rotate by a fan motor (not shown) to facilitate heat dissipation of a refrigerant.

The expander 234 may be provided between the condenser 233 and the evaporator 232 inside the second case 210 to lower a pressure and temperature of a refrigerant received from the condenser 233 and then transfer the refrigerant to the evaporator 232 such that a heat absorption action by evaporation of a refrigerant easily occurs. That is, the refrigerant passed through the expander 234 may change from a high-temperature, high-pressure liquid state to a low-temperature, low-pressure liquid state.

Herein, the expander 234 may be an expansion valve or a capillary tube.

The evaporator 232 may phase change a refrigerant being in a low-temperature, low-pressure liquid state to a refrigerant being in a low-temperature, low-pressure gaseous state.

As shown in FIG. 7, the evaporator 232 may be positioned inside the water tank 240, and perform heat exchange with a coolant in the water tank 240 through heat absorption by evaporation of a refrigerant received from the expander 234.

The evaporator 232 may be a cooling flow path through which a refrigerant flows to cool surroundings by the flowing refrigerant. The evaporator 232 may be in a shape of a spring.

The evaporator 232 formed in the shape of the spring may form a cooling flow path being in a shape of a cylinder.

The evaporator 232 may be in a shape of a spiral.

The evaporator 232 may sink into the coolant.

While the compressor operates, a low-temperature, low-pressure refrigerant may pass through the evaporator to supply cool air to the coolant. On a surface of the evaporator 232, ice may be made according to a temperature of the coolant and whether or not the compressor operates.

The evaporator 232 may store cool air required for a cold water path 280 to generate cold water.

In an inside space 240a of the water tank 240, a coolant may be stored, and the coolant may be cooled through heat exchange with the evaporator 232.

Herein, the coolant may be a cold storage medium that is cooled by the cooling device and takes away heat from the cold water path 280. The coolant may be a material capable of phase changing to a liquid and a solid according to a change of a temperature. The coolant may be a fluid capable of forming a water stream by an agitating operation of an agitator 290. Also, water purified by the filter module may be used as a coolant. That is, the coolant may be water.

Inside the water tank 240, the cold water path 280 through which purified water flows may be provided. The purified water flowing through the cold water path 280 may be cooled to cold water having a lower temperature than a reference temperature by the coolant.

The cold water path 280 may be provided around the evaporator 232.

The cold water path 280 may be provided outside the evaporator 232. More specifically, the cold water path 280 may be in a shape of a spring. As such, the cold water path 280 formed in the shape of the spring may form a cold water path being in a shape of a cylinder.

The cold water path 280 may be in a shape of a spiral.

The cold water path 280 may be a heat exchange pipe in which purified water filtered by the filter module is heat-exchanged with the coolant, and the cold water path 280 may be made of a stainless material.

As shown in FIG. 6, the cold water path 280 may include a purified water inlet path 281 which is connected with the purified water inlet 261 and purified water enters, and a cold water outlet path 282 which is connected with the second purified water outlet 262 and supplies cold water in the cold water path 280 to the second purified water outlet 262.

On the cold water outlet path 282, a cold water supply valve 283 for transferring cold water generated in the cold water path 280 to the water supply module 20 or blocking the cold water from being supplied to the water supply module may be provided.

The cold water supply valve 283, which adjusts supply of cold water cooled in the cold water path 280, may adjust supply of cold water in correspondence to a cold water supply command received through a cold water button of the inputter 22 and cut off supply of cold water in correspondence to reception of a cold water cut-off command. The cold water supply valve 283 may include a solenoid valve.

As shown in FIG. 8, in the water tank 240 of the water purifier, a cold water path 280 for drinking, through which cold water for drinking flows, and a cold water path 241 for coolant, through which cold water for coolant flows may be provided. Herein, the cold water path for drinking may be the cold water path 280 of FIG. 6.

In this case, the cold water path 280 for drinking and the cold water path 241 for coolant may be connected with the filter module 100, and receive purified water from the filter module 100. That is, the cold water path 280 for drinking and the cold water path 241 for coolant of the water tank 240 may receive purified water from the filter module 100 through the first purified water outlet 143.

The water purifier may further include a cold water supply valve 283 for drinking that adjusts supply of cold water to the cold water path 280 for drinking, and a cold water supply valve 242 for coolant that adjusts supply of cold water to the cold water path 241 for coolant.

That is, the water purifier may supply purified water to the cold water path 280 for drinking and the cold water path 241 for coolant or block purified water from being supplied to the cold water path 280 for drinking and the cold water path 241 for coolant by controlling on/off of the cold water supply valve 283 for drinking and the cold water supply valve 242 for coolant.

The water purifier may be connected with a drain pipe 243 for discharging the coolant (that is, water) of the water tank to the outside. The drain pipe 243 may discharge the water used as the coolant to the outside. The drain pipe 243 may be connected with the drain outlet 264.

On the drain pipe 243, a drain valve 244 for adjusting discharge of the coolant may be provided.

As shown in FIG. 7, the evaporator 232 may be accommodated in an inside space of the cold water path 280 being in the shape of the cylinder.

The cold water path 280 may receive cool air from the coolant between the evaporator 232 and the cold water path 280 to cool purified water.

That is, the coolant may be cooled by the evaporator 232. At this time, the cool air of the coolant may be transferred to the cold water path 280 to cool purified water flowing through the cold water path 280.

In the water tank 240, the agitator 290 for agitating the coolant therein may be provided. The agitator 290 may include an agitating motor 291 and an agitating body 292.

The agitating motor 291 may be provided outside the water tank 240, and the agitating body 292 may be provided inside the water tank 240.

The agitating body 292 may be connected with one end of a shaft of the agitating motor 291, and the agitating body 292 may rotate by receiving a driving force of the agitating motor 291 through the shaft of the agitating motor. The shaft of the agitating motor 291 may penetrate an inside space of the evaporator 232 being in the shape of the cylinder.

The agitating body 292 may be provided in an inside space of a cylindrical body formed by the cold water path 280 being in the shape of the cylinder. The agitating body 292 may agitate the coolant inside the water tank 240.

The agitating body 292 may form a rotating water stream in the coolant existing in the inside space of the cylindrical body formed by the cold water path 280.

The agitating body 292 may include a blade.

By a rotation operation of the agitating body 292 of the agitator 290, the coolant may flow inside the water tank. Accordingly, a temperature of the coolant may become constant in the inside space of the water tank 240.

At this time, the coolant in the water tank may flow in a height direction (or a longitudinal direction) of the water tank. At this time, the agitator may accelerate generation of cold water in the cold water path by increasing a convective heat transfer coefficient.

Inside the water tank 240, a temperature sensor (245 of FIG. 9) for detecting an inside temperature of the water tank 240 and outputting temperature information about the detected temperature may be provided.

The temperature sensor (245 of FIG. 9) may detect a temperature of the coolant in the water tank 240. That is, the temperature sensor (245 of FIG. 9) may be provided at an area corresponding to a location at which a temperature of the coolant is easily detected in an area around the cold water path 280.

In addition, the cooling and heating module of the water purifier may include a hot water device (not shown).

The hot water device may include a hot water inlet path for receiving purified water from the first purified water outlet 143, a hot water tank for storing purified water supplied from the hot water inlet path, and a heater provided in the hot water tank to heat purified water of the hot water tank. The hot water device may further include a hot water outlet path for transferring hot water in the hot water tank to the outside, and may further include a hot water supply valve provided on the hot water outlet path to supply or block hot water of the hot water tank.

In the hot water tank, a hot water temperature sensor (not shown) for detecting a temperature of hot water may be provided.

The hot water supply valve may adjust supply of hot water in correspondence to a hot water supply command received through a hot water button of the inputter 22, and adjust cut-off of hot water in correspondence to reception of a hot water cut-off command. The hot water supply valve may be a solenoid valve.

Figure 9:
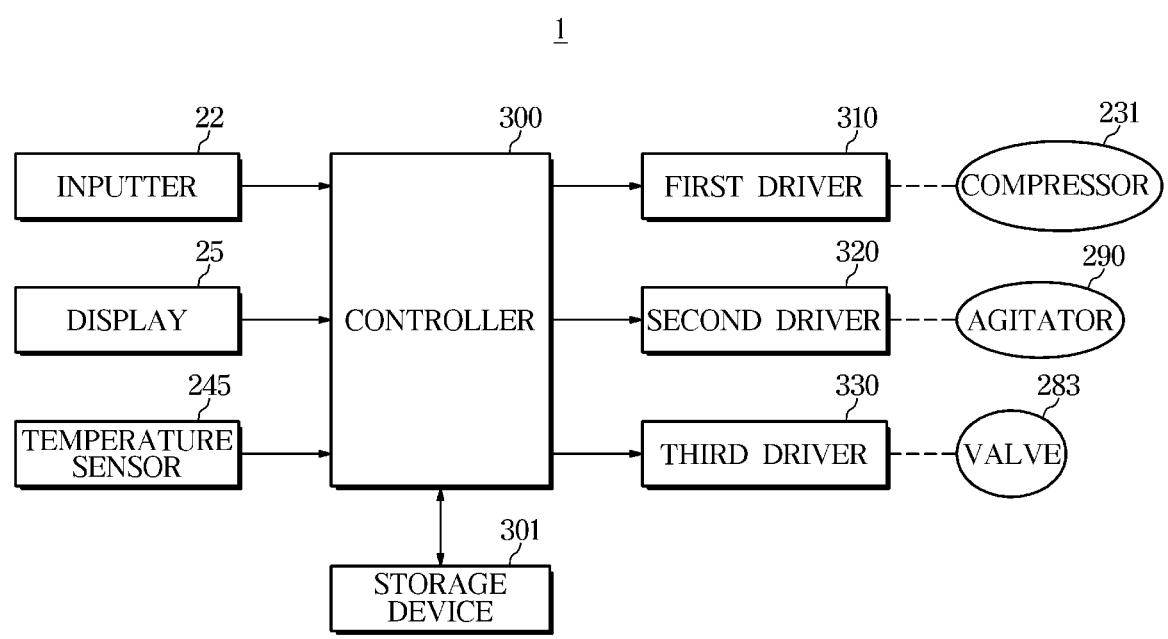
FIG. 9 is a control configuration view of a water purifier according to an embodiment.

FIG. 9 is a control configuration view of a water purifier according to an embodiment. More specifically, FIG. 9 is a control configuration view for controlling a cooling and heating module or a cold water module provided in a water purifier. That is, FIG. 9 is a control configuration view of a water purifier for generating cold water.

The water purifier 1 may include the inputter 22, a display 25, the temperature sensor 245, a controller 300, a storage device 301, a first driver 310, a second driver 320, and a third driver 330.

The inputter 22 may receive a user input.

The inputter 22 may receive an ice-making time as a user input. Herein, the ice-making time may be a time for which ice is made around the evaporator.

The inputter 22 may receive a cold water supply command and a cold water cut-off command.

The inputter 22 may receive a supply amount of cold water. Herein, the supply amount of cold water may be large, medium or small, or may be a volume, such as 200 ml and 500 ml.

The inputter 22 may receive a purified water supply command and a purified water cut-off command, and may receive a hot air supply command and a hot water cut-off command.

The inputter 22 may include a hardware device, such as various buttons or switches, a pedal, a keyboard, a mouse, a track-ball, various levers, a handle, a stick, etc., for a user input.

Also, the inputter 22 may include a Graphic User Interface (GUI), that is, a software device, such as a touch pad, for a user input. The touch pad may be implemented as a Touch Screen Panel (TSP) and form an interlayer structure with the display.

In a case in which the inputter 22 is configured as a touch screen panel (TSP) forming an interlayer structure with a touch pad, the display may also be used as an inputter.

The display 25 may display operation information of the water purifier, and display operation information corresponding to a user input.

For example, the display 25 may display information about a kind of water, such as purified water, cold water, or hot water, selected by a user, and display information about a supply amount of water, selected by the user.

The purified water may be purified water at a room temperature, the cold water may be purified water below a first reference temperature, and the hot water may be purified water above a second reference temperature.

A temperature below the first reference temperature, which is a temperature range of cold water, may be a temperature set by a user.

The first reference temperature may be lower than the room temperature, and the second reference temperature may be higher than the room temperature.

The display may be a Digital Light Processing (DLP) panel, a Plasma Display Panel, a Liquid Crystal Display (LCD) panel, an Electro Luminescence (EL) panel, an Electrophoretic Display (EPD) panel, an Electrochromic Display (ECD) panel, a Light Emitting Diode (LED) panel, or an Organic Light Emitting Diode (OLED) panel, etc., although not limited thereto.

The temperature sensor 245 may detect an inside temperature of the water tank 240, that is, a temperature of the coolant, and output temperature information about the detected temperature of the coolant to the controller 300.

The temperature sensor 245 may include a thermistor.

The controller 300 may control an operation of the water purifier in correspondence to a user input received through the inputter 22, and control a display of operation information of the water purifier, corresponding to the user input received through the inputter 22.

For example, the controller 300 may control supply of purified water in correspondence to a purified water supply command among user inputs received through the inputter 22, control supply of cold water in correspondence to a cold water supply command, and control supply of hot water in correspondence to a hot water supply command.

The controller 300 may adjust an amount of water that is supplied through the water supply module in correspondence to a supply amount among user inputs received through the inputter 22.

The controller 300 may control opening and closing operations of various valves provided in the water purifier upon a control of the supply and supply amount of purified water, cold water, or hot water.

The controller 300 may control the cooling and heating module such that purified water in the water tank is maintained at a temperature that is lower than or equal to the first reference temperature and purified water in the hot water tank is maintained at a temperature that is higher than or equal to the second reference temperature.

To generate hot water and maintain a temperature of the hot water, the controller 300 may control on/off of the heater in the hot water tank, based on temperature information of hot water, detected by a temperature sensor (not shown) installed in the hot water tank.

More specifically, in a case in which a temperature of hot water in the hot water tank is lower than or equal to a heater-on temperature, the controller 300 may control an on operation of the heater for hot water to heat the hot water in the hot water tank, and in a case in which the temperature of the hot water is higher than or equal to a heater-off temperature, the controller 300 may control an off operation of the heater for hot water to stop heating the hot water in the hot water tank. Herein, the heater-on temperature and the heater-off temperature may have been set in advance based on the second reference temperature.

Also, in a case in which the water purifier includes only the cold water module, the controller 300 may control the cold water module such that purified water in the water tank is maintained at a temperature that is lower than or equal to the first reference temperature.

Hereinafter, control components of the controller 300 for generating cold water and maintaining a temperature of the cold water will be described.

The controller 300 may control operations of the compressor 231 and the agitator 290 based on temperature information about a temperature detected by the temperature sensor 245. Herein, the temperature information may be temperature information of the coolant.

In a case in which the expander of the cooling device is an expansion valve, the controller 300 may control an opening operation or a closing operation of the expansion valve based on temperature information of the coolant, or control an opening degree of the expansion valve.

The controller 300 may identify whether a temperature of the coolant is higher than or equal to an on temperature of the compressor, based on the temperature information of the coolant, and according to an identification that the temperature of the coolant is higher than or equal to the on temperature of the compressor, the controller 300 may control the compressor 231 and the agitator 290 to operate simultaneously.

Controlling the compressor 231 to operate may include rotating a compressor motor at preset first revolutions per minute (rpm), and controlling the agitator 290 to operate may include rotating the agitating motor at preset second rpm. The controller 300 may cool the coolant in the water tank by controlling a simultaneous operation of the compressor 231 and the agitator 290 in a state in which a temperature of the coolant is higher than or equal to the on temperature of the compressor. This may be referred to as a pre-cooling mode or a first mode.

The controller 300 may identify whether a temperature of the coolant reaches a preset ice-making temperature, based on coolant temperature information about a temperature detected by the temperature sensor 245, while performing the pre-cooling mode, and according to an identification that the temperature of the coolant reaches the preset ice-making temperature, the controller 300 may cause the compressor 231 to operate alone by controlling the agitator 290 to stop.

Identifying whether the temperature of the coolant reaches the preset ice-making temperature may include identifying whether the temperature of the coolant is lower than or equal to the preset ice-making temperature in the pre-cooling mode.

Identifying whether the temperature of the coolant reaches the preset ice-making temperature may include identifying whether an individual operation time of the compressor comes.

The temperature of the coolant in the pre-cooling mode may be lowered by an operation of the compressor.

The preset ice-making temperature may be lower than the on temperature of the compressor or higher than an off temperature of the compressor.

The controller 300 may make ice around the evaporator in the water tank by controlling the compressor to operate alone in a state in which the temperature of the coolant is lower than or equal to the preset ice-making temperature. This may be referred to as an ice-making mode or a second mode.

The controller 300 may count a time elapsed from an individual operation start time at which the compressor starts operating alone, and according to an identification that the counted time reaches a preset ice-making time, the controller 300 may control the agitator to again operate.

The counted time may be an operation time for which the compressor operates alone.

The individual operation start time of the compressor may be identical to a time at which the agitator stops operating. That is, the counted time may be a stop time for which the agitator stops, elapsed from the time at which the agitator stops.

According to an identification that the operation time for which the compressor operates alone elapses the preset ice-making time, the controller 300 may cause the agitator and the compressor to again operate simultaneously by controlling the agitator to again operate. At this time, ice made around the evaporator may be mixed with the coolant to thus further lower the temperature of the coolant. This may be referred to as a main cooling mode or a third mode.

The controller 300 may repeatedly control the pre-cooling mode and the ice-making mode one time, two times, or more.

The controller 300 may change the preset ice-making time to an ice-making time received through the inputter 22, and store the ice-making time. The preset ice-making time may have been set upon manufacturing of the water purifier.

The controller 300 may identity whether the temperature of the coolant reaches the preset ice-making temperature, based on coolant temperature information about a temperature of the coolant, detected by the temperature sensor, after the main cooling mode terminates, and according to an identification that the temperature of the coolant reaches the preset ice-making temperature, the controller 300 may control the compressor to operate alone, in such a way as to control the compressor to operate alone for the preset ice-making time.

According to the identification that the operation time for which the compressor operates alone elapses the preset ice-making time, the controller 300 may control the compressor and the agitator to operate simultaneously. That is, the controller 300 may repeatedly control the main cooling mode and the ice-making mode.

Identifying whether the temperature of the coolant reaches the preset ice-making temperature may include identifying whether a temperature of the coolant of which a temperature is increasing by termination of the main cooling mode reaches the preset ice-making temperature.

According to an identification that a time elapsed from a time at which a cold water supply command has been received is longer than or equal to a preset time, the controller 300 may identify whether the temperature of the coolant is higher than or equal to the on temperature of the compressor, based on coolant temperature information about a temperature detected by the temperature sensor 245, and according to an identification that the temperature of the coolant is higher than or equal to the on temperature of the compressor, the controller 300 may control the compressor and the agitator to operate simultaneously.

The controller 300 may check, while controlling a simultaneous operation of the compressor and the agitator, coolant temperature information about a temperature of the coolant, detected by the temperature sensor 245, identify whether the temperature of the coolant is lower than or equal to the off temperature of the compressor based on the checked coolant temperature information, and control the compressor and the agitator to stop according to an identification that the temperature of the coolant is lower than or equal to the off temperature of the compressor.

Controlling the compressor and the agitator to stop may include stopping rotating the compressor motor and stopping rotating the agitating motor.

The controller 300 may check a reception time of a last cold water supply command, count a time elapsed from the reception time of the cold water supply command, and identify whether the counted time reaches a preset time. That is, the controller 300 may identify whether the time elapsed from the reception time of the cold water supply command is longer than or equal to the preset time.

Upon reception of a cold water supply command, the controller 300 may control opening of the cold water supply valve 283 to supply cold water through the water supply module.

In correspondence to the control on the opening of the cold water supply valve 283 by the controller 300, purified water of the filter module may flow to the cold water path 280. At this time, the controller 300 may control opening of the raw water supply valve 43a to secure an amount of purified water in the filter module in correspondence to the purified water supply from the filter module 100. In this case, raw water may be supplied to the filter module 100 in correspondence to the control on the opening of the raw water supply valve 43a by the controller 300.

The controller 300 may control, upon reception of a cold water supply command, supply of cold water for a preset supply time and according to an elapse of the preset supply time, the controller 300 may control closing of the cold water supply valve 283.

The controller 300 may check, upon reception of a cold water supply command and selection information about a supply amount (or a water supply amount), an open time corresponding to the selected supply amount, and control opening and closing of the cold water supply valve 283 based on the checked open time.

The controller 300 may control, upon reception of a cold water cut-off command while supplying cold water, closing of the cold water supply valve 283 to cut off the supply of cold water.

The controller 300 may control, upon completion of the supply of cold water in correspondence to the reception of the cold water supply command, the compressor 231 and the agitator 290 to operate simultaneously, thereby performing the pre-cooling mode.

After controlling the supply of cold water in correspondence to the reception of the cold water supply command, the controller 300 may control the compressor to operate alone according to an identification that a temperature of the coolant is lower than the on temperature of the compressor and higher than the preset ice-making temperature, based on coolant temperature information about a temperature of the coolant, detected by the temperature sensor 245, thereby performing the ice-making mode.

The controller 300 may control, upon reception of a cold water supply command while performing the pre-cooling mode, opening of the cold water supply valve, identify whether a temperature of the coolant reaches the preset ice-making temperature based on coolant temperature information received from the temperature sensor 245, and continue to perform the pre-cooling mode or convert to the ice-making mode based on the identification on whether the temperature of the coolant reaches the preset ice-making temperature.

Converting to the ice-making mode may include causing the compressor to operate alone by controlling the agitator to stop.

The controller 300 may control, upon reception of a cold water supply command while performing the ice-making mode, opening of the cold water supply valve 283, identify whether a temperature of the coolant exceeds the preset ice-making temperature based on coolant temperature information received from the temperature sensor 245, control a conversion to the pre-cooling mode according to an identification that the temperature of the coolant exceeds the preset ice-making temperature, and maintain the ice-making mode according to an identification that the temperature of the coolant is lower than or equal to the preset ice-making temperature.

The controller 300 may control, while maintaining the ice-making mode, the compressor to operate alone to perform the ice-making mode for the preset ice-making time from the time at which the supply of cold water is completed.

The controller 300 may control, while maintaining the ice-making mode, the compressor to operate alone to perform the ice-making mode for the preset ice-making time from a time at which the ice-making mode starts after the pre-cooling mode corresponding to before the supply of cold water is completed.

Controlling the conversion to the pre-cooling mode may include controlling the agitator and the compressor to operate simultaneously.

The controller 300 may control the agitator to operate alone while supplying cold water.

The controller 300 may control opening of the cold water supply valve upon reception of a cold water supply command in a stop state of the compressor, the pre-cooling mode, the ice-making mode, or the main cooling mode, and control the agitator to operate.

The controller 300 may control the agitator to operate alone according to an identification that a supply amount of cold water supplied through the water supply module 20 is less than or equal to a reference supply amount.

According to an identification that the supply amount of cold water supplied through the water supply module 20 exceeds the reference supply amount, the controller 300 may control the pre-cooling mode or the ice-making mode based on coolant temperature information received from the temperature sensor 245.

The controller 300 may be implemented with a memory (not shown) that stores algorithms for controlling the operations of components in the water purifier or data for programs for executing the algorithms, and a processor (not shown) that performs the above-described operations using the data stored in the memory. The memory and the processor may be implemented as separate chips. Alternatively, the memory and the processor may be integrated into a single chip.

The controller 300 may be implemented as, for example, CPU (or DSP, MPU, etc.), application specific integrated circuit (ASIC), SoC, MICRO COMPUTER (MICOM), etc.

The controller 300 may control a plurality of hardware or software components connected with the controller 300 and perform various data processing and computations by driving operating system (OS) or application programs.

The storage device 301 may store temperature information about the preset ice-making temperature, the on temperature of the compressor, and the off temperature of the compressor.

The storage device 301 may store time information about the preset ice-making time.

The storage device 301 may store a water supply time corresponding to a cold water supply command, that is, time information about a time for which the cold water supply valve opens.

The storage device 301 may store time information about an open time of the cold water supply valve corresponding to a water supply amount. Herein, the water supply amount may include a supply amount of purified water, a supply amount of cold water, and a supply amount of hot water.

The storage device 301 may change the preset ice-making time to an ice-making time received through the inputter in correspondence to a control command from the controller 300, and store the received ice-making time.

The storage device 301 may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium, such as Hard Disk Drive (HDD) and CD-ROM, although not limited to these.

The storage device 301 may be implemented as a separate chip from the processor described above in regard of the controller 300, or the storage device 301 and the processor may be integrated into a single chip.

The storage device 301 may store an operating system (OS) program that manages components and resources (software and hardware) included in the water purifier.

The first driver 310 may drive or stop the compressor 231 in correspondence to a control command from the controller 300. That is, the compressor 231 may be turned on or off in correspondence to a control command from the controller 300.

The first driver 310 may adjust rpm of the motor of the compressor inside the compressor 231 in correspondence to a control command from the controller 300. The first driver 310 may include an inverter.

The second driver 320 may drive the agitator 290 in correspondence to a control command from the controller 300. The second driver 320 may drive the agitating motor 291 of the agitator in correspondence to a control command from the controller 300.

The agitator 290 may be turned on or off in correspondence to a control command from the controller 300.

The second driver 320 may adjust rpm of the agitating motor 291 in correspondence to a control command from the controller 300. The second driver 320 may include an inverter.

The second driver 320 may adjust a pulse width of current or a voltage in order to adjust current to be applied to the agitating motor 291 or a voltage of the motor. That is, the second driver 320 may adjust PWM.

The third driver 330 may drive the valve 283 in correspondence to a control command from the controller 300. The valve 283 may be opened/closed or adjust an opening degree in correspondence to a control command from the controller 300.

Herein, the valve 283 may be the cold water supply valve 283 connected with the cold water path.

The third driver 330 may adjust current or a voltage that is supplied to the valve 283.

The water purifier may further include a fan driver for controlling driving of the fan for heat dissipation in correspondence to operations of the compressor, the condenser, the evaporator, and the expander.

At least one component may be added or omitted to correspond to the performances of the components of the water purifier shown in FIG. 9. Also, it will be easily understood by one of ordinary skill in the art that the relative locations of the components can be changed to correspond to the performance or structure of the system.

Meanwhile, each of the components shown in FIG. 9 may be a software component, and/or a hardware component, such as Field Programmable Gate Array (FPGA) and Application Specific Integrated Circuit (ASIC).

Figure 10A:
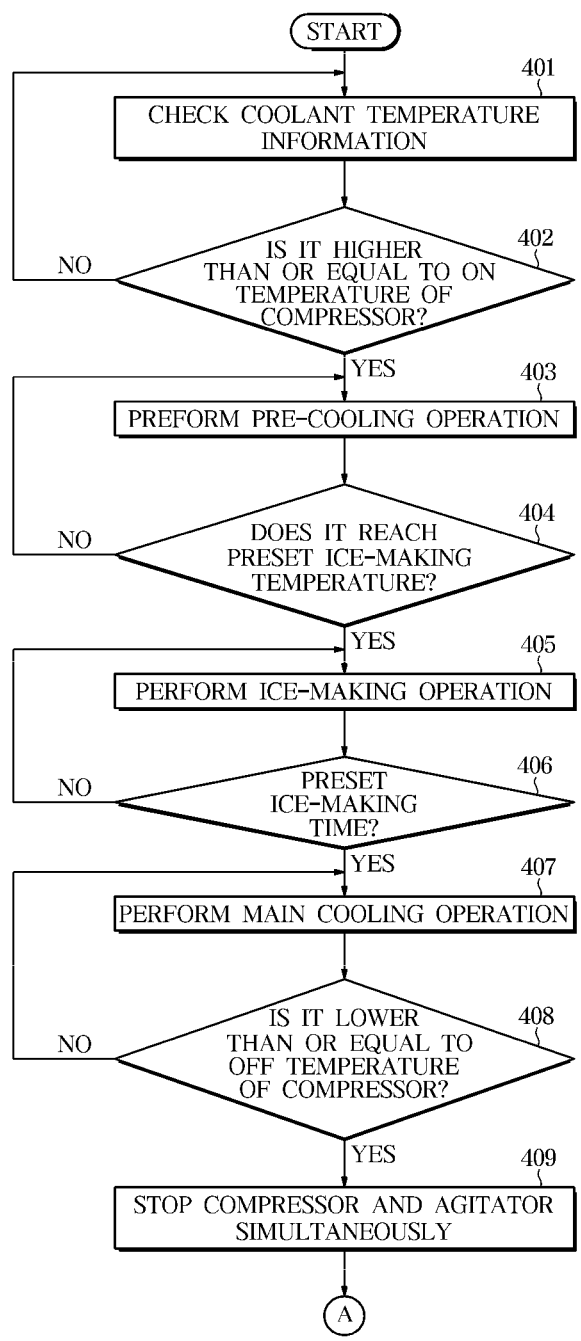
FIGS. 10A and 10B are control flowcharts of a water purifier according to an embodiment.
Figure 10B:
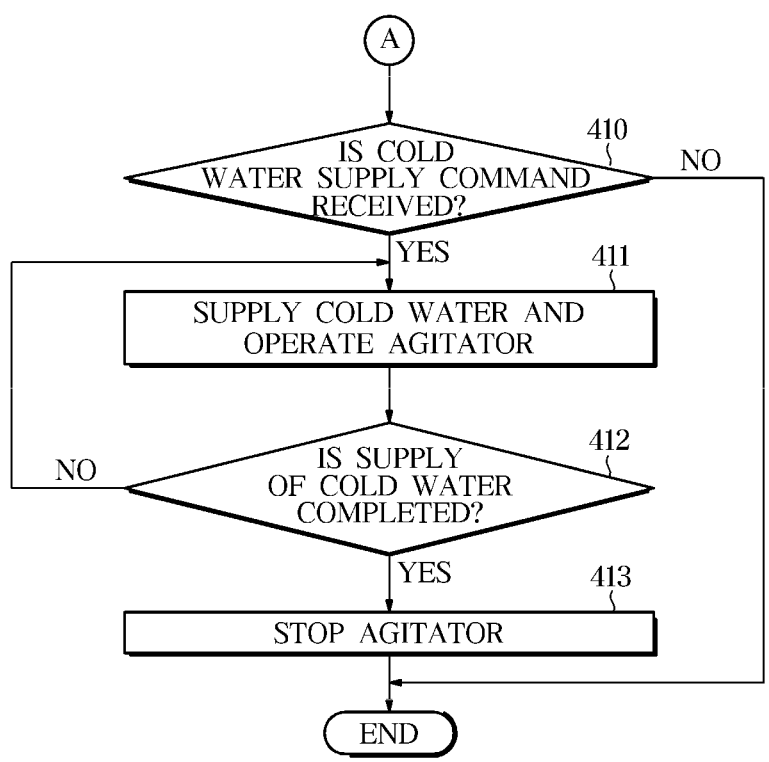
Figure 11:
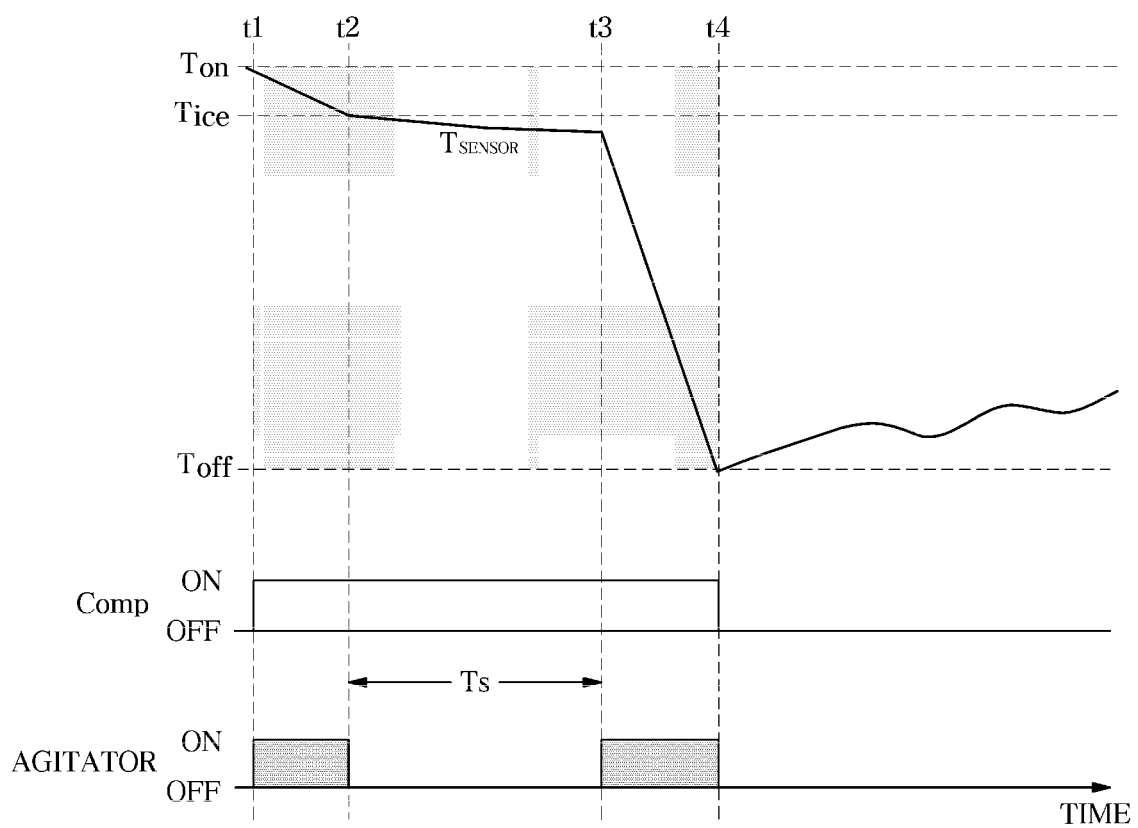
FIG. 11 shows an example of operations of a compressor and an agitator of a water purifier according to an embodiment.

FIGS. 10A and 10B are control flowcharts of a water purifier according to an embodiment, and will be described by referring to FIG. 11. FIG. 11 shows an example of operations of a compressor and an agitator.

Hereinafter, a control operation of the water purifier to generate cold water and supply cold water will be described.

The water purifier may receive purified water from the filter module 100 and store the received purified water in the cold water path.

The water purifier may check temperature information about a temperature of a coolant, detected by the temperature sensor 245 (401). The water purifier may check temperature information at regular time intervals.

The water purifier may identify whether a temperature Tsensor of the coolant is higher than or equal to an on temperature Ton of the compressor, based on the checked temperature information (402), and control the agitator 231 and the compressor 290 to operate simultaneously according to an identification that the temperature of the coolant is higher than or equal to the on temperature of the compressor.

Controlling the compressor 231 to operate may include rotating the compressor motor at preset first rpm, and controlling the agitator 290 to operate may include rotating the agitating motor at preset second rpm.

The first rpm and the second rpm may be rpms set upon manufacturing of the water purifier, and may have been set based on a reference temperature of cold water.

The first rpm and the second rpm may change according to a temperature of cold water.

Controlling the compressor 231 to operate may include causing a compressed refrigerant in the compressor to be discharged by rotating the compressor motor provided in the compressor.

Also, controlling the agitator 290 to operate may include causing the agitating body 292 to perform an agitating operation by rotating the agitating motor 291.

The water purifier may control the compressor 231 and the agitator 290 to operate simultaneously in a state in which the temperature of the coolant is higher than or equal to the on temperature of the compressor, thereby cooling the coolant in the water tank 240. That is, the water purifier may perform the pre-cooling mode or the first mode (403).

The refrigerant discharged from the compressor by the operation of the compressor while the pre-cooling mode is performed may move to the condenser 233, the expander 234, and the evaporator 233, sequentially, through the refrigerant pipe, and then return to the compressor 231.

While the refrigerant circulates in the pre-cooling mode, the coolant in the water tank 240 may be cooled rapidly through forced convection by the operation of the agitator. The coolant around the evaporator 232 among the coolant in the water tank 240 may start being frozen (making ice) on the surface of the evaporator.

Then, the water purifier may identify whether a temperature Tsensor of the coolant reaches a preset ice-making temperature Tice, based on coolant temperature information about a temperature of the coolant, detected by the temperature sensor 245 while the pre-cooling mode is performed (404), and control the agitator 290 to stop according to an identification that the temperature Tsensor of the coolant reaches the preset ice-making temperature Tice. That is, the water purifier may operate the compressor alone.

Herein, identifying whether the temperature of the coolant reaches the preset ice-making temperature may include identifying whether the temperature of the coolant is lower than or equal to the preset ice-making temperature while the pre-cooling mode is performed.

While the pre-cooling mode is performed, the temperature of the coolant may be decreasing by the operation of the compressor.

The preset ice-making temperature may be lower than the on temperature of the compressor or higher than the off temperature of the compressor.

The water purifier may make ice around the evaporator in the water tank by controlling the compressor to operate alone in a state in which the temperature of the coolant is lower than or equal to the preset ice-making temperature. That is, the water purifier may perform the ice-making mode or the second mode (405).

As such, because the agitator stops while the ice-making mode is performed, forced convection in the water tank may stop, and a temperature of the coolant around the evaporator among the coolant may be lowered rapidly by natural convection. Accordingly, an area of ice-making may be widened from around the evaporator toward an outer side. At this time, a large amount of ice may be made in the water tank.

The water purifier may count a time elapsed from a time t2 at which the compressor starts operating alone, identify whether the counted time reaches a preset ice-making time ts (406), and control the agitator to again operate according to an identification that the counted time reaches the preset ice-making time ts.

Herein, a time at which an operation of controlling the compressor to operate alone starts may be identical to a time at which the agitator stops.

A time for which the compressor operates alone may be identical to a stop time for which the agitator stops.

That is, because the ice-making mode is performed only for the preset ice-making time, an amount of ice in the water tank may be prevented from being excessively made to exceed a reference amount of ice, and accordingly, an agitating operation of the agitator may be prevented from being limited.

According to an identification that the time for which the compressor operates alone elapses the preset ice-making time, the water purifier may cause the agitator and the compressor to again operate simultaneously by controlling the agitator to again operate. At this time, ice made around the evaporator may be mixed with the coolant to further lower the temperature of the coolant. That is, the water purifier may perform the main cooling mode or the third mode (407).

The water purifier may maintain a constant amount of ice in the water tank by performing the main cooling mode in a state in which a large amount of ice is made on the surface of the evaporator. At this time, cool air of the ice may be transferred uniformly to inside of the water tank by forced convection of the coolant. Accordingly, cold water in the cold water path may be cooled rapidly by the coolant that is forcedly convected.

The water purifier may check, while controlling the compressor and the agitator to operate simultaneously, coolant temperature information about a temperature of the coolant, detected by the temperature sensor 245, identify whether a temperature Tsensor of the coolant is lower than or equal to an off temperature Toff of the compressor based on the checked coolant temperature information (408), and control the compressor and the agitator to stop simultaneously according to an identification that the temperature of the coolant is lower than or equal to the off temperature Toff of the compressor (409).

While no cold water supply command is received in a state in which the compressor and the agitator stop, the water purifier may detect a temperature of the coolant at regular time intervals and perform the pre-cooling mode based on the detected temperature of the coolant and the on temperature of the compressor.

While no cold water supply command is received in the state in which the compressor and the agitator stop, the water purifier may detect a temperature of the coolant at regular time intervals and perform the ice-making mode based on the detected temperature of the coolant and the preset ice-making temperature.

The water purifier may identify whether a cold water supply command is received through the inputter 22 (410), open the cold water supply valve 283 according to an identification that a cold water supply command is received to supply cold water in the cold water path 280 through the water supply module 20, and control the agitator to operate (411).

The water purifier may identify cold water supply completion (412), and control the agitator to stop according to an identification that the supply of cold water has been completed (413).

Upon reception of a cold water supply command, the water purifier may control opening of the cold water supply valve 283 for a preset supply time to discharge a preset supply amount of cold water through the water supply module.

Purified water of the filter module may flow into the cold water path 280 in correspondence to the supply of cold water. At this time, the water purifier may supply raw water to the filter module 100 by opening the raw water supply valve 43a to secure an amount of purified water by the supply of purified water.

The water purifier may check, upon reception of a cold water supply command and selection information about a supply amount, an open time corresponding to the selected supply amount, and open the cold water supply valve based on the checked time.

Upon reception of a cold water cut-off command while supplying cold water, the water purifier may close the cold water supply valve to cut off the supply of cold water.

Upon reception of a cold water supply command in a stop state of the compressor, the pre-cooling mode, the ice-making mode, or the main cooling mode, the water purifier may open the cold water supply valve and control the agitator 290 to operate alone.

That is, the water purifier may operate the agitator 290 while supplying cold water. This will be described in more detail.

As cold water is supplied to a user, purified water having a temperature exceeding a first reference temperature may be supplied to the cold water path in the water purifier, and a temperature of the coolant around the cold water path may rise up to a temperature that is higher than a temperature of the coolant at the other area due to the purified water having the temperature exceeding the first reference temperature. Accordingly, it may take a longer time to lower the temperature of the purified water in the cold water path.

Accordingly, to reduce a time for lowering the temperature of the purified water in the cold water path, the water purifier may agitate the coolant in the water tank 240 by operating the agitator 290. Thereby, the coolant around the cold water path may be mixed with the coolant at the other area or move in position. As a result, an ambient temperature of the cold water path may become lower than a temperature before agitating.

Accordingly, by lowering an ambient temperature of the cold water path and thus lowering a temperature of purified water in the cold water path while cold water is supplied, it may be possible to continuously supply cold water to a user. That is, a large amount of cold water may be supplied to a user.

The water purifier may identity whether the temperature of the coolant reaches the preset ice-making temperature, based on coolant temperature information about a temperature of the coolant, detected by the temperature sensor, after the main cooling mode terminates, and according to an identification that the temperature of the coolant reaches the preset ice-making temperature, the water purifier may control the compressor to operate alone, in such a way as to control the compressor to operate alone for the preset ice-making time.

Identifying whether the temperature of the coolant reaches the preset ice-making temperature may include identifying whether a temperature of the coolant of which a temperature is increasing by termination of the main cooling mode reaches the preset ice-making temperature.

Thereafter, the water purifier may control the compressor and the agitator to operate simultaneously according to an elapse of the preset ice-making time. That is, the water purifier may control the main cooling mode and the ice-making mode to be repeated alternately.

The water purifier may check a reception time of a last cold water supply command, identify whether a temperature of the coolant is higher than or equal to the on temperature of the compressor based on coolant temperature information about a temperature detected by the temperature sensor 245, according to an identification that a time elapsed from the checked reception time of the last cold water supply command is longer than or equal to a preset time, and control the compressor 231 and the agitator 290 to operate simultaneously according to an identification that the temperature of the coolant is higher than or equal to the on temperature of the compressor.

The water purifier may perform the pre-cooling mode or the ice-making mode based on cold water supply information about a supply amount of cold water or a supply time of cold water.

Figure 12:
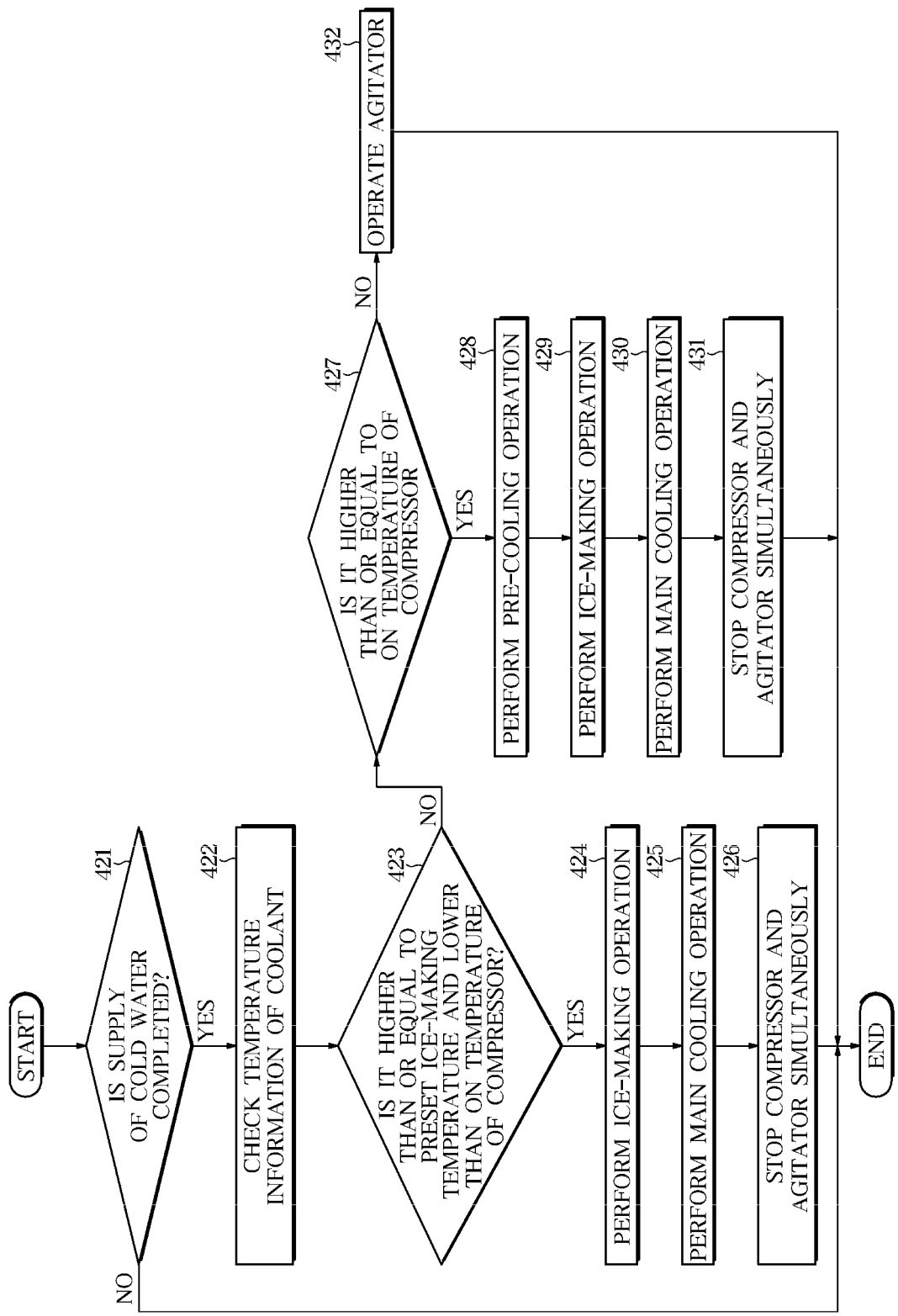
FIG. 12 is a control flowchart of a water purifier according to an embodiment after supply of cold water is completed.

This will be described with reference to FIG. 12.

The water purifier may check a time elapsed after the compressor stops, and perform the pre-cooling mode and the ice-making mode based on a temperature of the coolant according to an identification that the checked time elapses the preset time.

Upon completion of cold water supply, the water purifier may check a supply amount of cold water, and according to an identification that the checked supply amount of cold water is more than or equal to a reference supply amount, the water purifier may perform the pre-cooling mode and the ice-making mode based on a temperature of the coolant.

Upon completion of cold water supply, the water purifier may check a supply time for which cold water is supplied in correspondence to a cold water supply command, and according to an identification that the checked supply time exceeds a preset supply time, the water purifier may perform the pre-cooling mode or the ice-making mode based on a temperature of the coolant.

That is, upon completion of cold water supply in correspondence to reception of a cold water supply command (421), the water purifier may check coolant temperature information about a temperature of the coolant, detected by the temperature sensor 245 (422), and identify whether the temperature of the coolant is higher than or equal to the preset ice-making temperature and lower than the on temperature of the compressor based on the checked temperature information about the temperature of the coolant (423).

According to an identification that the temperature of the coolant is higher than or equal to the preset ice-making temperature and lower than the on temperature of the compressor, the water purifier may perform the ice-making mode by controlling the compressor to operate alone (424).

Then, according to an identification that the ice-making mode has been performed for the preset ice-making time, the water purifier may perform the main cooling mode by controlling the compressor and the agitator to operate simultaneously (425).

Then, according to an identification that a temperature of the coolant reaches the off temperature of the compressor in the main cooling mode, the water purifier may control the compressor and the agitator to stop simultaneously (426).

Meanwhile, according to an identification that a temperature of the coolant, detected by the temperature sensor 245 is higher than or equal to the on temperature of the compressor after the supply of cold water is completed (427), the water purifier may perform the pre-cooling mode by controlling the compressor and the agitator to operate simultaneously (428).

Then, according to an identification that a temperature of the coolant is the preset ice-making temperature, the water purifier may perform the ice-making mode by controlling the agitator to stop while maintaining the operation of the compressor (429).

Then, according to an identification that the ice-making mode has been performed for the preset ice-making time, the water purifier may perform the main cooling mode by controlling the compressor and the agitator to operate simultaneously (430).

Then, according to an identification that a temperature of the coolant reaches the off temperature of the compressor while the main cooling mode is performed, the water purifier may control the compressor and the agitator to stop (431).

Also, according to an identification that a temperature of the coolant is lower than the preset ice-making temperature after the supply of cold water is completed, the water purifier may agitate the coolant in the water tank 240 by operating only the agitator to maintain a temperature of cold water in the cold water path 280 constant (432).

As such, by continuously performing agitation or performing the ice-making mode in a state in which a large amount of ice is made on the surface of the evaporator although a user inputs a plurality of cold water supply commands after cold water is supplied, the user may receive a large amount of cold water of which a temperature is lower than or equal to the first reference temperature.

Also, by alternately and repeatedly performing the pre-cooling mode, the ice-making mode, and the main cooling mode even after cold water is supplied, a large amount of cold water may be generated and supplied several times within a short time.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be ROM, RAM, a magnetic tape, a magnetic disc, a flash memory, an optical data storage device, etc.

So far, the disclosed embodiments have been described with reference to the accompanying drawings. It will be apparent that those skilled in the art can make various modifications thereto without changing the technical spirit and essential features of the present disclosure. Thus, it should be understood that the embodiments described above are merely for illustrative purposes and not for limitation purposes.

What is claimed is:

1. A water purifier comprising:
   a water tank having a cold water path inside the water tank;
   a coolant inside the water tank;
   a cooling device including an evaporator inside the water tank and through which a refrigerant flows, and a compressor that is operable to compress the refrigerant, the cooling device configured to cool the coolant so that the coolant cools water flowing through the cold water path;
   a temperature sensor configured to detect a temperature of the coolant and output coolant temperature information about the detected temperature of the coolant;
   an agitator that is operable to agitate the coolant; and
   a controller configured to:
      control the compressor and the agitator to operate simultaneously to cool the coolant, and
      control the agitator to stop operating while the compressor is controlled to continue operating based on the coolant temperature information output by the temperature sensor indicating that the temperature of the coolant is lower than or equal to a preset ice-making temperature during the cooling of the coolant.

2. The water purifier of claim 1, wherein the controller is configured to identify whether the temperature of the coolant is higher than or equal to a preset on temperature of the compressor based on the coolant temperature information, and, based on identifying that the temperature of the coolant is higher than or equal to the preset on temperature of the compressor, the controller is configured to control the compressor and the agitator to operate simultaneously.

3. The water purifier of claim 2, wherein the preset ice-making temperature is lower than or equal to the preset on temperature of the compressor.

4. The water purifier of claim 1, wherein the control of the agitator to stop operating stops the agitator from operating for a preset ice-making time.

5. The water purifier of claim 4, wherein, after the agitator has stopped operating for the preset ice-making time, the controller is configured to control the compressor and the agitator to operate simultaneously by controlling the agitator to again operate.

6. The water purifier of claim 1, wherein the controller is configured to identify whether the temperature of the coolant is lower than or equal to a preset off temperature of the compressor based on the coolant temperature information, and based on identifying that the temperature of the coolant is lower than or equal to the preset off temperature of the compressor, the controller is configured to control the compressor and the agitator to stop operating simultaneously.

7. The water purifier of claim 1, further comprising:
an inputter configured to receive a cold water supply command from a user; and
a cold water supply valve connected with the cold water path,
wherein the controller is configured to control, upon reception of the cold water supply command through the inputter, opening of the cold water supply valve and control the agitator to operate.

8. The water purifier of claim 1, wherein the controller is configured to control the compressor and the agitator such that,
in a first mode, the compressor and the agitator operate simultaneously, and,
in a second mode, the compressor operates and the agitator stops operating, and
the first mode and the second mode are repeatedly performed.

9. The water purifier of claim 1, wherein the agitator includes an agitating motor, and an agitating body configured to agitate the coolant by rotation of the agitating body.

10. The water purifier of claim 1, further comprising:
a filter module configured to purify water by removing impurities from input raw water and to transfer the purified water to the water tank.

11. The water purifier of claim 10, further comprising:
a hot water module configured to provide hot water by heating the purified water.

12. A method for controlling a water purifier that includes a water tank having a cold water path inside the water tank, a coolant inside the water tank, a cooling device including an evaporator inside the water tank through which a refrigerant flows and a compressor that is operable to compress the refrigerant so that the cooling device is configured to cool the coolant so that the coolant cools water flowing through the cold water path, a temperature sensor configured to detect a temperature of the coolant and output coolant temperature information about the detected temperature of the coolant, and an agitator that is operable to agitate the coolant, the method comprising:
based on the coolant temperature information output by the temperature sensor indicating that the temperature of the coolant is lower than or equal to a preset ice-making temperature,
performing a first mode of simultaneously operating the compressor and the agitator;
after the first mode, performing a second mode of stopping the operation of the agitator and continuing the operation of the compressor for a preset ice-making time so that ice is made around the evaporator after the coolant is cooled to a temperature being lower than or equal to the preset ice-making temperature; and
after a preset ice-making time from when the operation of the agitator was stopped, performing a third mode of simultaneously operating the agitator and the compressor so that the ice made around the evaporator is maintained in a frozen state.

13. The method of claim 12, wherein the water purifier includes an inputter configured to receive a cold water supply command from a user, and a cold water supply valve connected with the cold water path, the method further comprising:
controlling opening of the cold water supply valve upon reception of the cold water supply command through the inputter, and
after opening the cold water supply valve, controlling the agitator to operate.

14. The method of claim 12, wherein the water purifier includes an inputter configured to receive a cold water supply command from a user, and a cold water supply valve connected with the cold water path, the method further comprising:
controlling opening of the cold water supply valve upon reception of the cold water supply command through the inputter in a state in which the agitator is controlled to stop operating, to supply cold water to the cold water path; and
controlling, upon completion of the supply of cold water to the cold water path, the agitator to again operate based on a temperature of the coolant and the preset ice-making temperature.

15. A computer-readable medium comprising instructions which, when executed by a computer, cause the computer to perform the method of claim 12.

* * * * *